Aug. 17, 1965   H. HUBBELL   3,200,989
LOCKING WEATHERPROOF COVER ATTACHMENT FOR ELECTRICAL OUTLET BOX
Filed June 13, 1962   3 Sheets-Sheet 1

INVENTOR.
Harvey Hubbell
BY
Wooster, Davis & Cifelli
Attys.

Aug. 17, 1965   H. HUBBELL   3,200,989
LOCKING WEATHERPROOF COVER ATTACHMENT FOR ELECTRICAL OUTLET BOX
Filed June 13, 1962   3 Sheets-Sheet 2
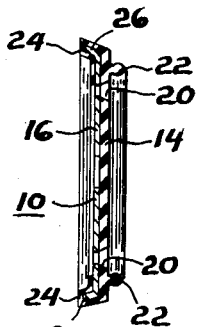
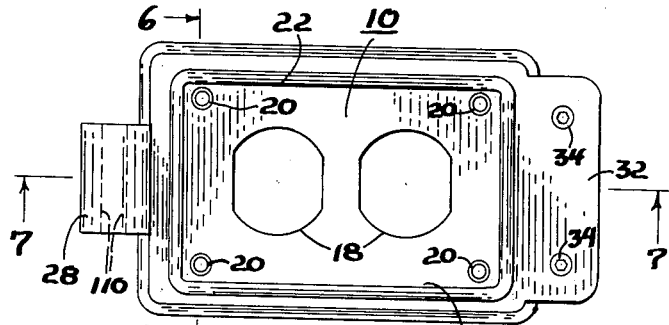
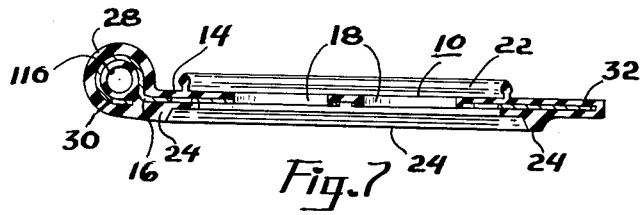
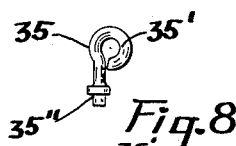
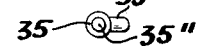
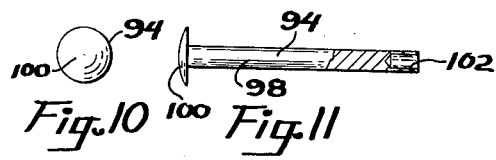
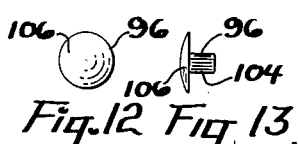
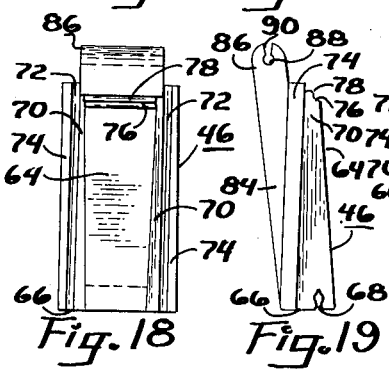
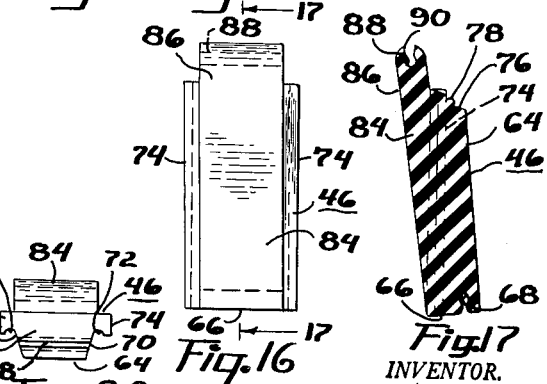
INVENTOR.
Harvey Hubbell
BY
Wooster, Davis + Cifelli
attys.

Aug. 17, 1965          H. HUBBELL          3,200,989
LOCKING WEATHERPROOF COVER ATTACHMENT FOR ELECTRICAL OUTLET BOX
Filed June 13, 1962          3 Sheets-Sheet 3

INVENTOR.
Harvey Hubbell
BY Wooster, Davis + Cifelli
Attys.

United States Patent Office 3,200,989
Patented Aug. 17, 1965

3,200,989
LOCKING WEATHERPROOF COVER ATTACHMENT FOR ELECTRICAL OUTLET BOX
Harvey Hubbell, Southport, Conn., assignor to Harvey Hubbell, Incorporated, Bridgeport, Conn., a corporation of Connecticut
Filed June 13, 1962, Ser. No. 202,240
4 Claims. (Cl. 220—24.3)

This invention relates to electrical wiring devices and more particularly to electrical outlet boxes that house such devices and must be sealed so as to be weatherproof.

It is extremely important in many electrical wiring device applications and environments, such as marine and certain industrial and other installations, that electrical wiring devices be sealed in a weatherproof manner. Examples of such installations are farmyards, automobile-washing shops and dairy processing plants. In general, these installations have in common the problem of rain water and/or flying spray and liquid that is likely to penetrate electrical wiring devices and damage them or cause their malfunctioning.

It is also desirable in many electrical wiring device applications where electrical outlet boxes are exposed in a public or semi-public location, either indoors or outdoors, to prevent unauthorized access to or tampering with the wiring devices or of the usual attachment plug caps that may be connected to such devices. Unauthorized tampering with electrical wiring devices can be a serious problem, and therefore, the provision of means for preventing such access and tampering is desirable by itself and also when dealing with weatherproof electrical outlets where it is important to lock the weatherproofing means of such outlets to retain them in weatherproofed condition.

It is an object of the invention to provide an improved electrical outlet box for housing an electrical wiring device which is particularly well suited for marine, industrial and other installations where it is subjected to rain water and flying spray and liquid, because it is capable of being sealed in a weatherproof manner and locked at all times.

The object of my invention is accomplished in one form by the provision in association with an electrical outlet box of an attachment therefor which includes cover means that is capable of sealing the electrical outlet box and rendering it weatherproof, and which cover means is also capable of being locked and rendering it tamperproof, both when an attachment plug cap is associated with or removed from the device in the outlet box.

The above and other objects of my invention and further details of that which I believe to be novel and my invention will be clear from the following description and claims taken with the accompanying drawings, wherein:

FIG. 5 is a front elevational view of the mounting plate which forms a part of the attachment;

FIG. 6 is a sectional view taken substantially on line 6—6 of FIG. 5;

FIG. 7 is a sectional view taken substantially on line 7—7 of FIG. 5;

FIGS. 8 and 9 are, respectively, side and end elevational views of an eye which forms a part of the locking means of the attachment;

FIGS. 10 and 11, are, respectively, end and side elevational views, the latter with portions broken away and shown in section, of one part of a pin for hinging the cover of the attachment, illustrated in FIGS. 21–24, to the mounting plate of FIGS. 5–7;

FIGS. 12 and 13 are, respectively, end and side elevational views of another part of the hinge pin;

FIGS. 14 and 15 are, respectively, end and side elevational views of a pin for hinging the cord entrance opening closure, illustrated in FIGS. 16–20, to the attachment cover;

FIG. 16 is a rear elevational view of the cord entrance opening closure;

FIG. 17 is a sectional view taken on line 17—17 of FIG. 16;

FIG. 18 is a front elevational view of the cord entrance opening closure;

FIG. 19 is a side elevational view thereof;

FIG. 20 is bottom elevational view thereof;

Figure 1:
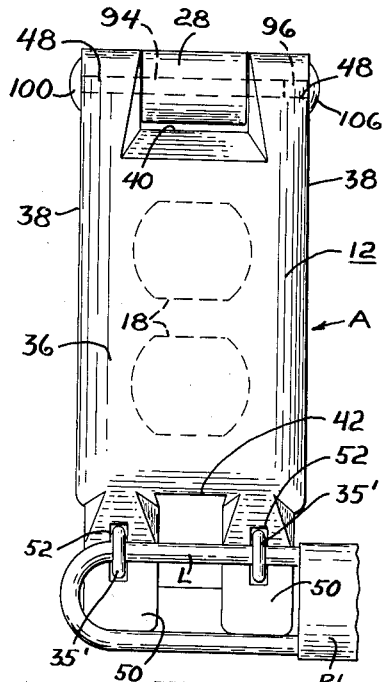
FIG. 1 is a front elecational view of an electrical outlet box in operative position having a locking weatherproofing cover attachment embodying the invention installed thereon.
Figure 2:
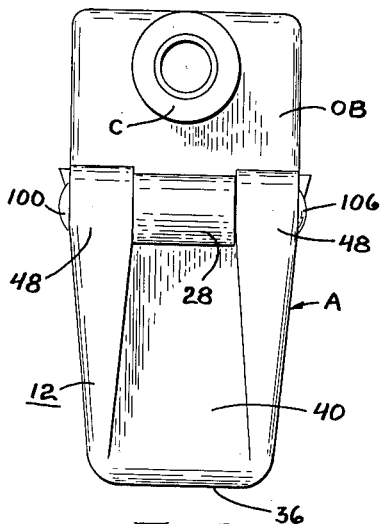
FIG. 2 is a top plan view thereof.

With reference to the drawings, one embodiment of my invention is illustrated as taking the form of an attachment for an electrical outlet box, for example, of the well known FS or FD types, which houses an electrical receptacle. The attachment is illustrated in fully assembled condition and as being installed on such an outlet box in FIGS. 1–4. The attachment is generally designated by reference character A, the outlet box by OB and the receptacle by R. Although the particular construction of the outlet box is not critical, as can best be seen in FIG. 4 is it generally rectangular and boxy, and includes an open front wall O through which an electrical wiring device, such as the receptacle R, may be inserted, to be fully disposed in and secured to the outlet box, and thereafter to be accessible for connection of cooperating attachment plug caps, such as caps P in FIGS. 3 and 4. Outlet box front wall O includes a peripheral bead B for contacting a covering plate that is usually mounted on the front of the outlet box, because in the normal installation which does not include my invention some sort of covering plate or cover is disposed over the open front wall of the outlet box and contacts the bead B to effect some sort of closure. It will be apparent to those skilled in the art that a typical single-gang FS box has been illustrated which includes a collar C at one end through which electrical cable (not shown), such as the well known armored cable, may extend and be sealed in a weatherproof manner to enable its electrical conductor wires to be disposed in and be available on the interior of the outlet box for connection to the terminals of the wiring device disposed therein.

At this point in the disclosure it may be helpful to realize that there are various types of pivoted sealing closures available in the art for use with outlet boxes which will cover their open front walls and weatherproof them when there are not any electrical attachment plug caps or other connectors associated with the wiring devices therein. It is one of the principal purposes of the instant invention to provide a means for weatherproofing an outlet box both when associated attachment plug caps or other connectors are connected to the wiring device in the outlet box and also when they are not. Known weatherproofing covers for outlet boxes are incapable of weatherproofing the outlet box when attachment caps are connected to the wiring device therein.

The attachment A generally omprises a mounting plate 10 and a cover 12 which are hingedly connected to each other by a two-part hinge pin. The mounting plate 10 is illustrated by itself in FIGS. 5–7. The cover 12 is illustrated by itself in FIGS. 21–24. The hinge pin parts are illustrated by themselves in FIGS. 10–13. The attachment A is illustrated by itself, i.e., free of an outlet box, in FIG. 25.

The mounting plate 10 comprises a generally planar plate-like body 14 formed, as by molding, of a suitable electrical insulating material, such as rubber, natural or synthetic, or another suitable plastic material, that is stiffened by a formed rigid insert plate 16 that is embedded therein and which may be made of a suitable metal, such as a stamped and pierced sheet metal steel plate. A pair of openings 18 are formed through both the body 14 and insert plate 16 in position to make the usual slotted face portions of the electrical receptacle R, which is illustrated as a duplex receptacle, available and accessible through the mounting plate 10. A plurality of small spaced openings 20 are formed through and generally at the corners of the mounting plate 10, i.e., both body 14 and insert plate 16, and arranged to receive conventional mounting screws for securing the mounting plate to the open front wall O of the outlet box OB. On the front side of body 14, shown in FIG. 5, spaced inwardly from its periphery is a continuous generally rectangular bead 22 having an acorn or arrowhead cross section projecting from the main front plane of the mounting plate 10. On the rear side of the body 14 (not shown) there is formed a generally rectangular rib 24 (see FIGS. 6 and 7) the longitudinal side portions of which (see FIG. 6) are stiffened by folded over side flanges 26 of the insert plate 16. At one end of the body 14, the upper end thereof, which is illustrated at the left hand side of FIGS. 5 and 7, is formed a laterally centrally disposed tubular hinge ear 28 stiffened by a curved portion 30 of the insert plate 16 to which the attachment cover is hinged. At the opposite end of the body 14, the lower end, there is formed a flat extension 32 in which a pair of sockets 34 is formed for receiving a pair of locking eyes 35, shown in FIGS. 8 and 9.

Eyes 35 comprise part of the means for locking the attachment cover 12 to the mounting plate 10, and each includes a ring portion 35′ and a mounting shank portion 35″. Shanks 35″ of eyes 35 are disposed in sockets 34 of mounting plate extension 32 and rigidly secured therein in any convenient manner, as by having their ends peened over.

The attachment cover 12, illustrated by itself in FIGS. 21–24, comprises a generally boxy open body made of a suitable material similar to that of the mounting plate body 14 and having a generally rectangular flat front wall 36, a pair of flat parallel side walls 38, a closed top wall 40 and a bottom wall 42 that has a generally rectangular cord entrance opening 44 formed therein. Cord entrance opening 44 may be selectively closed, in operation, by cord entrance opening closure 46, which is illustrated by itself in FIGS. 16–20, as will subsequently become apparent.

Figure 23:
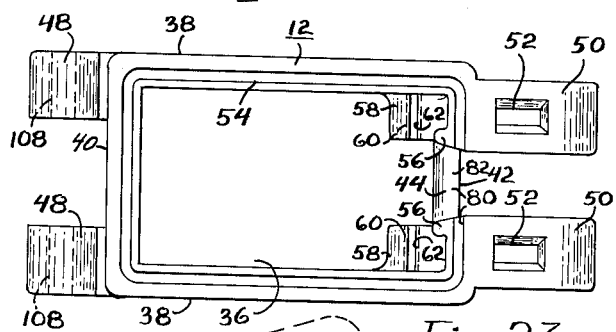
FIG. 23 is a rear elevational view of the cover.
Figure 24:
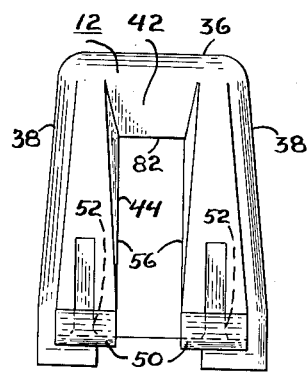
FIG. 24 is a bottom elevation thereof.

At the upper end of the cover 12 is formed a pair of spaced hinge ears 48 which extend upwardly away from top wall 40, and at its opposite (lower) end, a pair of downwardly projecting locking feet 50 is formed, each of which includes an aperture 52 that functions as a hasp that cooperates with an eye mounted on mounting plate extension 32 when the cover 12 is loced to the mounting plate 10. The rear edges of the walls 38, 40 and 42 are coplanar and have formed in them a rectangular groove 54 which is acorn-shaped or arrow-head-shaped in cross section and which is discontinued for a short stretch at opening 44 in bottom wall 42. With particular reference to FIG. 23 it will be observed that the entrance cord opening 44 in the wall 42 is formed by ball portions that extend inwardly of the wall, have facing surfaces that coverage in the outward direction relative to the wall and is formed in part by a rearwardly extending pair of side flanges 56. In the vicinity of the intersection of the front wall 42 and the top wall 36 of the cover at opposite sides thereof adjacent the side walls 38 is formed a pair of spaced bosses 58 having aligned openings 60 to receive and mount a hinge pin for the cord entrance opening closure with reduced entranceways 62 formed therein to permit forcing of the hinge pin into the openings 60.

The cord entrance opening 44 in the bottom wall 42 of the attachment cover 12 in operation is either allowed to remain open or be closed by utilization of the selectively positionable closure 46 illustrated in FIGS. 16–20. The cord entrance opening 44 is closed when there are not any electrical connectors, such as attachment plug caps P shown in FIGS. 3 and 4, connected to the wiring device, such as receptacle R, in the outlet box OB, by disposing the closure 46 relative to the cover 12 in the manner illustrated in FIG. 25. The cord entrance opening 44 is opened to permit the cords W shown in FIGS. 3 and 4, which are connected to the attachment plug caps P, to extend out of the interior of attachment A when connectors are attached to the wiring device in the outlet box by pivoting the closure 46 to its position shown in FIGS. 3 and 4.

Figure 3:
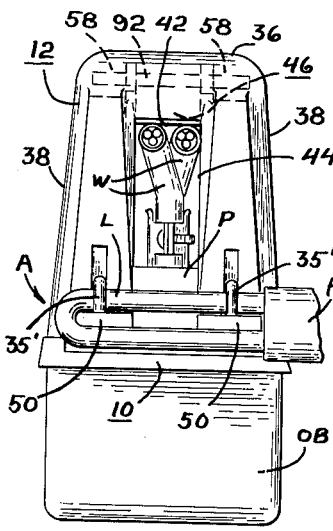
FIG. 3 is a bottom plan view thereof.
Figure 4:
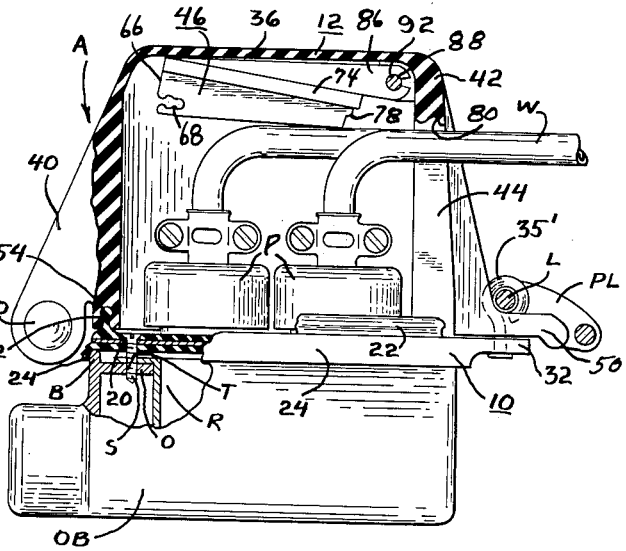
FIG. 4 is a side elevational view thereof, with portions broken away and shown in section for the sake of clarity, showing a pair of electrical attachment plug caps with associated electrical cords secured to the electrical wiring device, viz., a receptacle, that is mounted in the outlet box.
Figure 21:
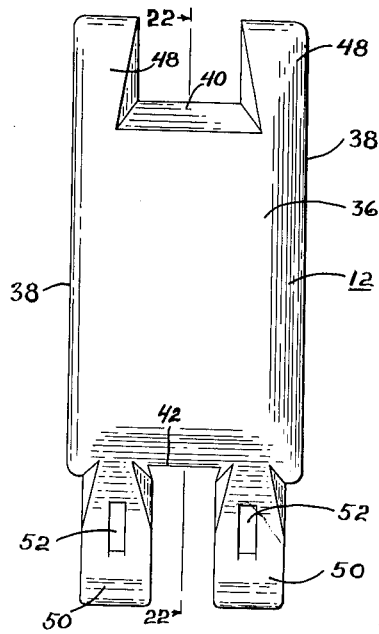
FIG. 21 is a front elevational view of the cover which forms a part of the attachment.
Figure 22:
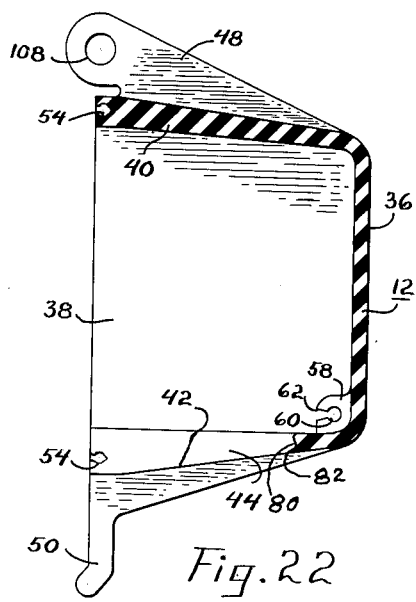
FIG. 22 is a sectional view taken on line 22—22 of FIG. 21.
Figure 25:
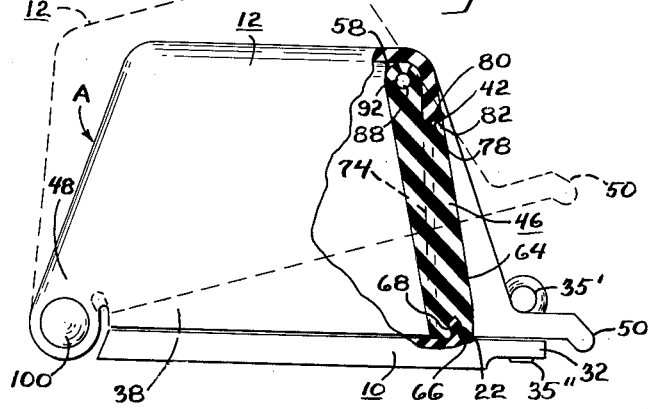
FIG. 25 is a side elevational view of the attachment, particularly showing the cover and the cord entrance opening closure operatively associated to close the cord entrance opening, with portions broken away and shown in section for clarity.

The cord entrance opening closure 46 is an irregularly shaped solid member formed of a similar material to that of attachment cover 12, which is pivotally secured to the cover so as to be selectively disposable either in its FIG. 25 or FIGS. 3 and 4 positions. Closure 46 is configured to fully complement cover bottom wall 42 and render it continuous when it is disposed in opening 44 as shown in FIG. 25. Closure 46 comprises a flat front wall 64 which is generally horizontally disposed at the bottom of the attachment cover but slightly inclined so as to be coplanar with the outer face of bottom wall 42 of the attachment cover when the closure is in its FIG. 25 position and the attachment is operatively positioned on an outlet box as illustrated in FIG. 1. An end wall 66 of the closure 46 is flat and has a straight groove 68 formed therein which aligns itself with and completes the groove 54 formed in the edges of the attachment cover walls 38, 40 and 42 to render the interrupted groove 54 continuous when the closure is in its FIG. 25 position, at which time the wall 66 is coplanar with the edges of cover walls 38, 40 and 42. Closure groove 68 is cross sectioned so as to be acorn-shaped or arrowhead-shaped and dimensioned in the same manner as the groove 54 is cross sectioned. Extending rearwardly from the closure front wall 64 is a pair of diverging side walls 70 which merge at their rearward ends with a pair of spaced grooves 72 formed in part by a pair of spaced forwardly extending side flanges 74. The top wall 76 of the closure 46 is rearwardly inclined upwardly and has a transversely extending bead 78 formed therein which is configured to nest with a complementarily cross sectioned transverse groove 80 formed in the transverse edge 82 of the bottom wall 42 which cooperates with the portions 56 to form the cord entrance opening 44 in the attachment cover 12 when the closure 46 is in its FIG. 25 position. On the rear side of the closure 46 is formed a rearwardly extending transversely central projection 84 which inclines upwardly and at its upper end 86 includes a transverse groove 88 having a reduced entranceway 90. The projection upper end 86 is transversely dimensioned to fit between the attachment cover bosses 58 and have its groove 88 aligned with the aligned grooves 60 of the bosses to receive a hinge pin 92, which is illustrated by itself in FIGS. 14 and 15. Hinge pin 92 comprises a short length of rod, which may be formed of a suitable metal, that hinges the closure 46 to the attachment cover 12 by being disposed in the grooves 60 and 88, as by being forced through their entranceways 62 and 90, respectively. The closure 46 is dimensioned so that when selectviely pivoted to and disposed in the FIG. 25 position it completely closes the cord entrance opening 44 in the attachment cover bottom wall 42, and at such time its tapered side walls 70 are in firm contact with the tapered surfaces of portions 56 which define in part the cord entrance opening 44, its bead 78 is disposed in groove 80 and its flanges 74 are disposed transversely outwardly of the portions 56, the rearward extremities of which are received in the grooves 72 of the closure.

The attachment cover 12 with the cord entrance opening closure 46 hingedly connected to it, as described above, is itself hinged to the mounting plate 10 by a two-part hinge pin illustrated in FIGS. 10–13. The cover hinge pin comprises part 94 and part 96. Part 94 comprises an elongated shank 98 having an enlarged head 100 at one axial end and an internal socket 102 formed at its other end. Part 96 comprises a short shank 104 that is externally knurled and an enlarged head 106 at one axial end. The attachment cover 12 is hinged to the mounting plate 10 by juxtaposing the cover hinge ears 48 to the mounting plate hinge ear 28, all of which are dimensioned to mesh, and inserting the hinge pin part 94 through one end of aligned openings 108 and 110 in the hinge ears 48 and 28, respectively, and inserting the other part 96 through the opposite end of the aligned openings and forcing its knurled shank 104 into the socket 102 of the hinge pin part 94 to effect a tight joint and permanently secure the hinge pin as an integral operative unit with the attachment cover 12 hingedly connected to the mounting plate 10, as shown in FIGS. 1–4 and FIG. 25.

When the attachment A is fully assembled, as illustrated in FIG. 25, it may be secured to the outlet box OB by inserting a plurality of mounting screws S through the openings 20 in the mounting plate 10 and anchoring them in threaded openings T in the front wall O of the outlet box to thereby permanently secure the mounting plate, and therefore the entire attachment A, to the front wall of the outlet box. A seal is formed at contacting portions of the outlet box and attachment by the frictional interengagement of the bead B on the outlet box front wall O and the rib 24 on the mounting plate 10. After securement of the mounting plate to the outlet box in this manner, the front wall of the outlet box is permanently sealed and the usual slotted portions of the receptacle R installed in the outlet box are accessible through the openings 18 in the mounting plate to permit insertion of the contacts of connectors, such as the usual male contact blades of attachment plug caps P. When operatively so disposed, particularly as illustrated in FIG. 1, it should be noted that the cord entrance opening 44 is disposed at the bottom of the installation. If it is desired to lock and seal the attachment without any connectors being attached to the receptacle R, the closure 46 is set in its FIG. 25 position wherein it completes and renders the bottom wall 42 of the cover 12 continuous. Then the cover is pivoted to its solid line FIG. 25 position, wherein the eyes 35 secured to the mounting plate extend through apertures 52 in the cover feet 50, and a long leg L of the shackle of the padlock PL is inserted through the eyes and the padlock may be closed to effectively lock the cover 12 to the mounting plate 10. As can best been seen in FIG. 25, at this time the acorn-shaped or arrowhead-shaped bead 22 of the mounting plate 10 is fully disposed within the continuous groove formed by grooves 54 and 68 of the cover 12 and closure 46, respectively, thereby rendering the attachment A locked and sealed in a watertight condition.

It it is desired to weatherproof and lock the attachment A with connectors, such as attachment plug caps P, connected to the receptacle R in the outlet box, prior to locking the attachment cover 12 to the mounting plate 10 in the closed condition, when the attachement cover is in its open dotted line position shown in FIG. 25, the cord entrance opening closure 46 is pivoted to its FIGS. 3 and 4 position, wherein it permits the opening 44 to remain open. The attachment plug caps P are connected to the receptacle and then the attachment cover 12 is pivoted to its closed solid line position in FIG. 25, and the padlock PL is disposed to lock the cover in such position. This is the condition illustrated in FIGS. 3 and 4, where it will be observed that the interior of the attachment is accessible through the open cord entrance opening 44 to permit the attachment plug cap cords W to extend out of the attachment to their source of electrical power. However, since the attachment A is installed so that the bottom wall 42 in which the opening 44 is formed is disposed at the bottom, as shown in FIG. 1, the attachment is weatherproof and capable of preventing any significant amount of rain water, spray or flying liquid from entering the interior of the attachment and contacting either the receptacle or attachment plug caps, particularly the contacts thereof. Although the attachment is not sealed in a watertight manner in this condition, as it is necessary to allow the cords W to extend out of it, for all practical purposes it is weatherproof, and it should be particularly noted that it may be locked in this weatherproof condition with connectors attached to the receptacle in the outlet box to prevent tampering.

In view of the foregoing it will be apparent that I have provided an improved attachment for an electrical outlet box which may be utilized in two principal conditions, one with connectors attached to the wring device housed in the outlet box, in which condition the attachment may be selectively disposed to be weatherproof and locked to be tamper-proof, and another condition wherein no connectors are attached to the wiring device housed in the outlet box, in which condition the attachment may be selectively disposed to be sealed in a waterproof manner and locked to be tamper-proof.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. A weatherproofing attachment for an electrical outlet box having an open vertical front comprising: a mounting plate arranged to be rigidly secured to the front of said outlet box and having a resilient portion in sealed relationship therewith at their points of engagement; a cover hingedly secured to said mounting plate; said mounting plate and cover having cooperating bead and groove means of similar cross section arranged to sealingly engage to form a chamber therebetween and effect a seal at their points of engagement; an opening in said cover disposed at a location which is under other portions of said cover when the attachment is operatively disposed on an electrical outlet box, whereby it is protected from falling rain, water or spray; and an adjustably positionable closure pivotally secured to said cover for selectively closing or uncovering said opening and arranged to be disposed within said cover in all positions, said adjustably positionable closure having a portion of said means formed on it which cooperates with the remainder of said means to effect a continuous seal between said cover and said plate when said closure is positioned to close said opening.

2. An attachment as defined in claim 1 wherein means is provided for locking said cover to said mounting plate with said closure positioned either to close or uncover said opening.

3. An attachment as defined in claim 2 wherein said locking means comprises apertures formed in said cover; eye means formed on said mounting plate and disposed to have ring portions extend through said apertures when said mounting plate and said cover engage; and a padlock arranged to have a leg of its shackle extend through said ring portions.

4. An attachment as defined in claim 1 wherein said cover has a bottom wall in which said opening is formed.

References Cited by the Examiner
UNITED STATES PATENTS

| | | | |
|---|---|---|---|
| 2,201,521 | 5/40 | Cook | 220—85 |
| 2,250,977 | 7/41 | Walker | 220—3.8 |
| 2,566,606 | 10/50 | Gregg | 174—67 |
| 2,646,187 | 7/53 | Roop | 220—31 |
| 2,765,094 | 10/56 | Ryan | 220—31 |
| 2,811,768 | 11/57 | Axelson | 220—31 |
| 2,880,264 | 3/59 | Ruskin | 174—67 |
| 2,916,733 | 12/59 | Hirsch. | |
| 2,984,725 | 5/61 | Hubell | 174—66 |

THERON E. CONDON, *Primary Examiner.*

EARLE J. DRUMMOND, *Examiner.*

UNITED STATES PATENT OFFICE
CERTIFICATE OF CORRECTION

Patent No. 3,200,989                                        August 17, 1965

Harvey Hubbell

It is hereby certified that error appears in the above numbered patent requiring correction and that the said Letters Patent should read as corrected below.

Column 3, line 22, for "omprises" read -- comprises --; column 4, line 12, for "loced" read -- locked --; line 19, for "ball" read -- wall --; line 21, for "coverage" read -- conver --; column 6, line 13, for "It" read -- If --; line 48, for "wring" read -- wiring --.

Signed and sealed this 5th day of April 1966.

(SEAL)
Attest:

ERNEST W. SWIDER                                    EDWARD J. BRENNER
Attesting Officer                                         Commissioner of Patents